(12) United States Patent
Hallihole et al.

(10) Patent No.: US 8,688,412 B2
(45) Date of Patent: Apr. 1, 2014

(54) SYSTEM AND METHOD FOR SOLVING CHEMICAL ENGINEERING EQUATIONS AND MODEL DEVELOPMENT USING EQUATION EDITOR

(75) Inventors: Sriram Hallihole, Bangalore (IN); Madhukar Madhavamurthy Gundappa, Bangalore (IN); Ranganathan Srinivasan, Bangalore (IN); J. Ward MacArthur, Scottsdale, AZ (US); Sanjay Venugopal, Bangalore (IN); Venkata K. P. Reddy Vurubindi, Atmakur (IN)

(73) Assignee: Honeywell International Inc., Morristown, NJ (US)

(*) Notice: Subject to any disclaimer, the term of this patent is extended or adjusted under 35 U.S.C. 154(b) by 622 days.

(21) Appl. No.: 12/756,042

(22) Filed: Apr. 7, 2010

(65) Prior Publication Data

US 2011/0251700 A1    Oct. 13, 2011

(51) Int. Cl.
*G06F 17/10* (2006.01)
*G05B 13/02* (2006.01)

(52) U.S. Cl.
USPC .................................. 703/2; 700/28; 700/29

(58) Field of Classification Search
USPC ......................................... 703/2; 700/28, 29
See application file for complete search history.

(56) References Cited

U.S. PATENT DOCUMENTS

| | | | |
|---|---|---|---|
| 6,056,781 A * | 5/2000 | Wassick et al. | 703/12 |
| 7,346,403 B2 | 3/2008 | Tanaka et al. | |
| 7,667,919 B1 * | 2/2010 | Rigney et al. | 360/75 |
| 2006/0004489 A1 | 1/2006 | Weiss | |
| 2007/0142936 A1 | 6/2007 | Denison et al. | |
| 2009/0143872 A1 | 6/2009 | Thiele et al. | |
| 2009/0259447 A1 * | 10/2009 | Langemyr et al. | 703/2 |
| 2011/0154362 A1 * | 6/2011 | Levy | 719/313 |

OTHER PUBLICATIONS

Notification of Transmittal of the International Search Report and the Written Opinion of the International Searching Authority, or the Declaration dated Nov. 2, 2011 in connection with International Patent Application No. PCT/US2011/029541.
"Reverse Polish notation", wikipedia, Mar. 30, 2010, 8 pages.
Theodore Norvell, "Parsing Expressions by Recursive Descent", 1999-2001, 9 pages.
Tom Niemann, "Operation Precedence Parsing", 2000, 11 pages.

* cited by examiner

*Primary Examiner* — Kamini S Shah
*Assistant Examiner* — Andre Pierre Louis

(57) ABSTRACT

A system includes a process controller and an equation evaluation apparatus. The equation evaluation apparatus includes an equation editor, a model factory, and an equation evaluation engine. The equation editor is adapted to receive equations describing a process to be controlled by the process controller. The equation editor is also adapted to generate model information representing the equations. The model factory is adapted to receive the model information and generate an equation stack representing the equations. The equation evaluation engine is adapted to receive evaluation information from the process controller, evaluate at least one of the equations using the evaluation information and the equation stack, and send a result of the evaluation to the process controller. The model information could include information representing algebraic equations, differential equations, algebraic states, differential states, inputs, parameters, constants, and/or expressions.

21 Claims, 5 Drawing Sheets

FIG. 5

| Task Pane | |
|---|---|
| Define Equations | |
| NL Model | |
| Evaluate Expressions | |
| Predict | |
| Export to Template | |
| Outputs | |
| Name | Value |
| | |
| DefineVariables | |
| DefineEquations | |
| ParameterEstimation | |

Equation Editor / Prediction / Gain Characteristics / Messages

Define Expressions (Rate, Heat Transfer, Mass Transfer and others)

r1 = k10*e^(E1/(Tr+273.15))*Ca
r2 = k20*e^(E2/(Tr+273.15))*Cb
r3 = k30*e^(E3/(Tr+273.15))*(Ca^2)

Parameters:
| Name | Value | NewValue |
|---|---|---|
| k10 | 1287000000... | 0 |
| k20 | 1287000000... | 0 |
| k30 | 9043000000 | 0 |
| E1 | -9758.3 | 0 |

Define Algebraic Expressions

Algebraic States [x]:
| Name | Value | NewValue |
|---|---|---|

Define Mass & Energy Balance Equations – Differential (xdot = f(x,u))

dCadt = F/V*Cain-F/V*Ca-(r1+r3)
dCbdt = -F/V*Cb+(r1-r2)
dTrdt = F/V*Tin-F/V*Tr-(1/(rho*Cp))*(r1*delH1+r2*delH2+r
dTjdt = (1/mK*Cpk))*(Qk+kw*Ar*(Tr-Tj))

Differential States [x]:
| Name | Value | NewValue |
|---|---|---|
| Ca | 1.23485459... | 0 |
| Cb | 0.90001877... | 0 |
| Tr | 134.139780... | 0 |
| Tj | 128.953365... | 0 |

Output Equations (y = g(x))

OutputConc = Cb
RecTemp = Tr

Inputs:
| Name | Value | NewValue |
|---|---|---|
| F | 188.3 | 0 |
| Qk | -4496 | 0 |
| Cain | 5.1 | 0 |
| Tin | 130 | 0 |

SYSTEM AND METHOD FOR SOLVING CHEMICAL ENGINEERING EQUATIONS AND MODEL DEVELOPMENT USING EQUATION EDITOR

TECHNICAL FIELD

This disclosure relates generally to process control systems. More specifically, this disclosure relates to a system and method for solving chemical engineering equations and model development using an equation editor for process control, simulation and optimization applications.

BACKGROUND

Processing facilities are often managed using process control systems. Example processing facilities include manufacturing plants, chemical plants, crude oil refineries, ore processing plants, and paper or pulp manufacturing and processing plants. Among other operations, process control systems typically manage the use of motors, valves, and other industrial equipment in the processing facilities.

In conventional process control systems, process controllers are often used to control the operation of the industrial equipment in the processing facilities. The process controllers could, for example, monitor the operation of the industrial equipment, provide control signals to the industrial equipment, and generate alarms when malfunctions are detected. Some process controllers operate using models of the processes being controlled. The models allow the controllers to determine, based on input signals from sensors or other data, how to control the industrial equipment.

SUMMARY

This disclosure provides a system and method for solving chemical engineering equations and model development using an equation editor for process control, simulation and optimization applications.

In a first embodiment, an apparatus for use with a process controller includes an equation editor, a model factory, and an equation evaluation engine. The equation editor is adapted to receive equations describing a process to be controlled by the process controller. The equation editor is also adapted to generate model information representing the equations. The model factory is adapted to receive the model information and generate an equation stack representing the equations. The equation evaluation engine is adapted to receive evaluation information from the process controller, evaluate at least one of the equations using the evaluation information and the equation stack, and send a result of the evaluation to the process controller.

In a second embodiment, a system includes a process controller and an equation evaluation apparatus. The equation evaluation apparatus includes an equation editor, a model factory, and an equation evaluation engine. The equation editor is adapted to receive equations describing a process to be controlled by the process controller. The equation editor is also adapted to generate model information representing the equations. The model factory is adapted to receive the model information and generate an equation stack representing the equations. The equation evaluation engine is adapted to receive evaluation information from the process controller, evaluate at least one of the equations using the evaluation information and the equation stack, and send a result of the evaluation to the process controller.

In a third embodiment, a method includes receiving equations describing a process to be controlled by a process controller. The method also includes generating model information representing the equations and generating an equation stack representing the equations. The method further includes receiving evaluation information from the process controller and evaluating at least one of the equations using the evaluation information and the equation stack. In addition, the method includes sending a result of the evaluation to the process controller.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIG. 5 illustrates an example equation editor used to describe a case study model according to this disclosure.

DETAILED DESCRIPTION

FIGS. 1 through 6, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
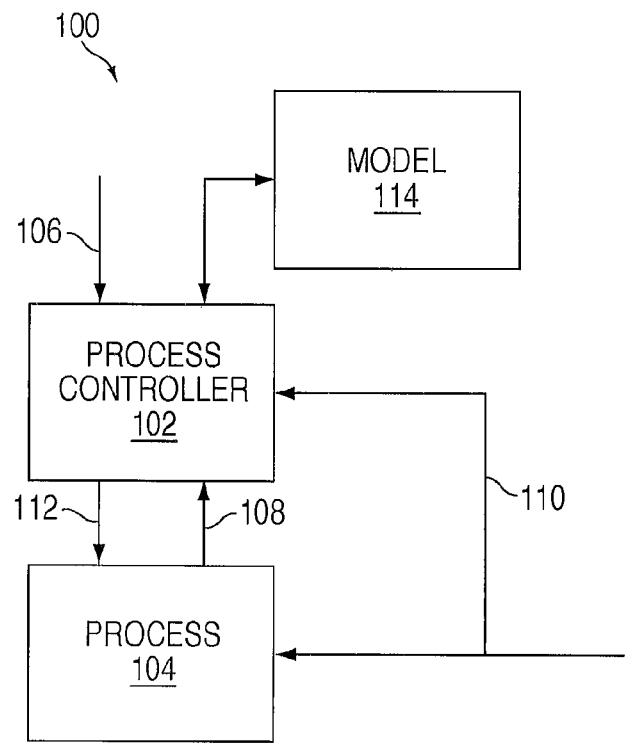
FIG. 1 illustrates an example system including a model-based process controller.

FIG. 1 illustrates an example system 100 including a model-based process controller 102. The process controller 102 controls a process 104, which represents any system or portion thereof configured to process one or more materials in some manner. The process controller 102 receives one or more target values 106 from an operator or higher-level process control system. An example target value is a desired concentration of a chemical produced by the process 104. The process controller 102 also receives measured values 108 for one or more controlled variables. An example of a controlled variable is a temperature of a reaction vessel in the process 104. The process controller 102 may also receive measured values 110 for one or more disturbance variables. An example disturbance variable is a temperature of a reaction element being fed into the reaction vessel. Based upon the target and measured values 106-110, the process controller 102 generates one or more control signals 112 for one or more manipulated variables to control the process 104 (ideally to achieve the target values 106).

The process 104 operates (and can be adjusted) in response to the manipulated variables and the disturbance variables. A current state of the process 104 is reflected in the values of the controlled variables.

Where the process 104 is a chemical process, it is often complex and/or non-linear in nature and may be described by ordinary differential equations (ODEs), differential algebraic equations (DAEs), and/or partial differential equations (PDEs). Such processes are often controlled using model-based process control systems. In such a control system, the process controller 102 utilizes a model 114 of the process 104 to calculate values for the manipulated variables based upon the target and measured values 106-110. Based upon a current state of the process 104, the process controller 102 may use the model 114 to determine what actions should be taken to achieve the target values 106. Possible changes to the manipulated or disturbance variables may be input to the model 114 in order to predict a possible reaction by the process 104.

Developing the model 114 from first principles may involve carrying out rigorous mass, energy and momentum balance equations on each species present in the equipment of the process 104. Furthermore, an engineer attempting to simulate real plant models in typical modeling software often needs to be familiar with one or more modeling languages specific to the software. For these reasons, modeling may become a job specific to engineers with specialized knowledge. Modeling may also be a time consuming task for both initial modeling and model revising.

A typical project implementing a process controller may involve some or all of the following steps: project scope definition, pre-test and step tests, control-relevant modeling, commissioning, auditing, and controller maintenance. In such a project, a significant portion of the project time and effort may be spent in the modeling, even where the process only requires simple linear transfer function models. Furthermore, if the project is to develop a non-linear controller, the engineers may be required to develop and validate non-linear models. These models may be developed empirically or from first principles. Developing such non-linear empirical models (both empirically and from first principles) using a modeling software package often requires knowledge of the modeling language, as well as knowledge of chemical engineering. Some modeling languages may be tedious to learn or use and may have numerous software integrations, making such modeling challenging for many users.

Figure 2:
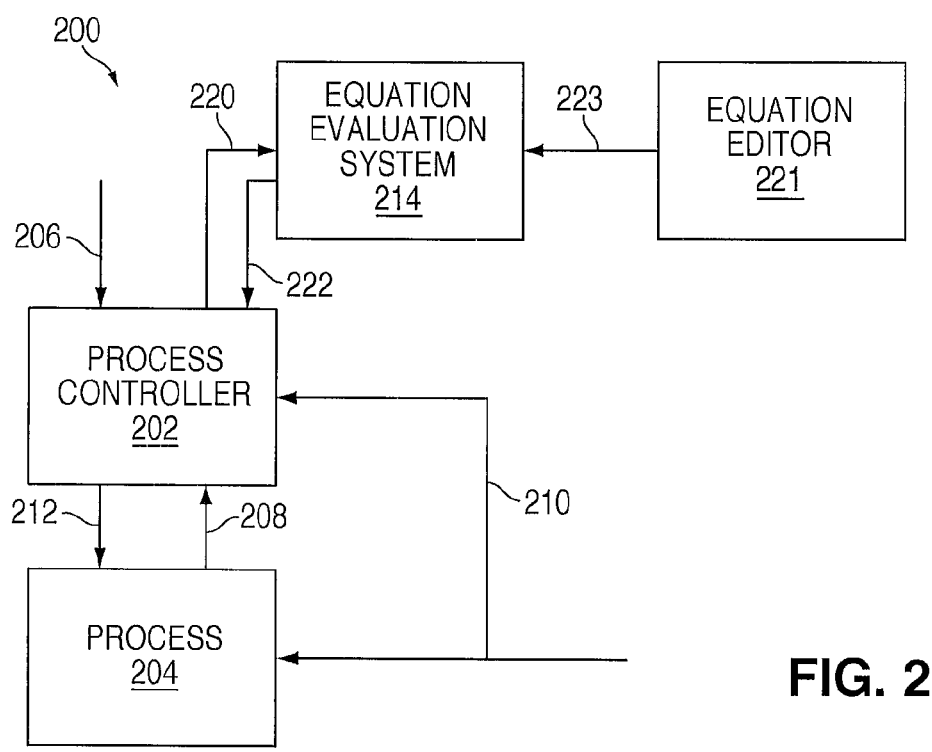
FIG. 2 illustrates an example system including a model-based process controller according to this disclosure.

FIG. 2 illustrates an example system 200 including a model-based process controller 202 according to this disclosure. As with FIG. 1, the process controller 202 controls a process 204 by receiving one or more target values 206, measured values 208 for one or more controlled variables, and possibly measured values 210 for one or more disturbance variables. Based upon the received values, the process controller 202 generates one or more control signals 212 for one or more manipulated variables to control the process 204 and ideally achieve the target values 206. The process 204 operates (and can be adjusted) in response to the manipulated variables and the disturbance variables. A current state of the process 204 is reflected in the values of the controlled variables.

In this example, an equation editor 221 provides a graphical user interface (GUI) tool that enables an engineer or other personnel to enter equations representing the process 204 using chemical engineering knowledge but without knowledge of a modeling software tool. The GUI tool may also offer features that a conventional modeling environment might offer, such as evaluating expressions and/or functions, highlighting compilation errors, solving systems of equations (e.g., ODES and DAEs), and visualizing and displaying results of simulations.

The equation editor 221 generates model information 223 that represents the equations entered by the user to describe the process 204. An equation evaluation system (EES) 214 receives the model information 223. During operation, the process controller 202 sends evaluation information 220 to the EES 214. The evaluation information 220 includes one or more identifiers associated with one or more equations to be evaluated, as well as other information required to evaluate the identified equation (s). The EES 214 receives the evaluation information 220 and evaluates the identified equation (s) using information from the model information 223 representing the identified equation (s) and the evaluation information 220. The EES 214 returns results 222 of the equation evaluation to the process controller 202.

Typical modeling environments are available to construct simple to complex process models, but such models typically cannot be directly used for controller studies since these modeling environments are specific to process model development only. The equation editor 221 and the equation evaluation system (EES) 214 not only generate the process model but also meet the requirements of the process controller 202 from a modeling perspective. That is, the equation editor 221 includes a GUI that allows the user to key in balance equations of certain simple chemical processes (described by, for example, ODEs and DAEs) based on chemical engineering knowledge without requiring knowledge of a modeling language. The equation editor 221 displays function evaluations for each of the entered expressions, solves systems of equations (e.g., ODEs and/or DAEs), and displays the simulation results in an intuitive way for interpretation by the user. The EES 214 may be used by the process controller 202 to carry out parameter estimation studies, model-based control strategies (both linear and non-linear), trajectory optimization studies, and other process control functions.

Figure 3:
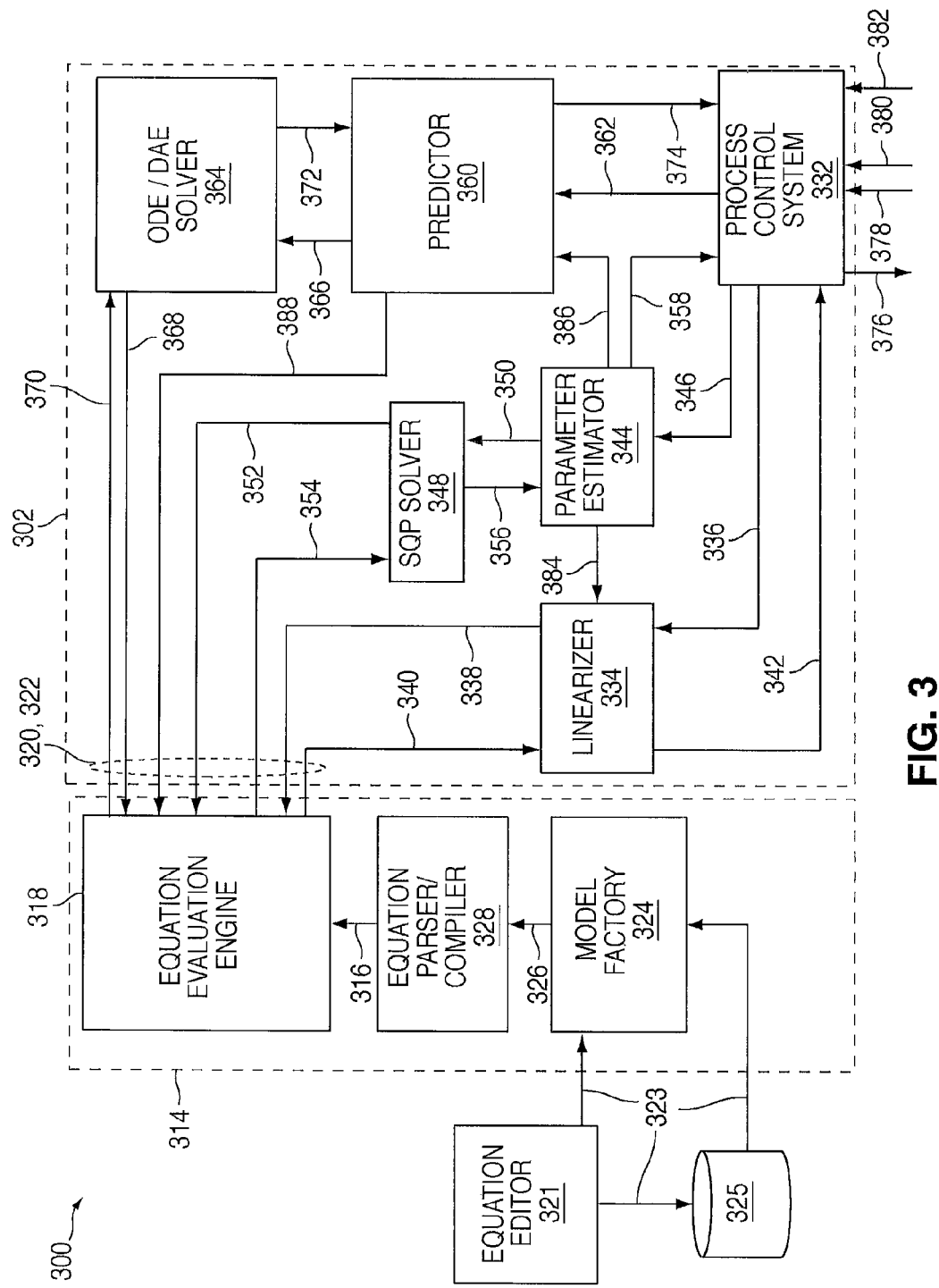
FIG. 3 illustrates another example system including a model-based process controller according to this disclosure.

FIG. 3 illustrates another example system 300 including a model-based process controller 302 according to this disclosure. The process controller 302 is communicatively coupled to an equation evaluation system (EES) 314, which is communicatively coupled to an equation editor 321. The EES 314 includes a model factory 324 communicatively coupled to the equation editor 321, an equation parser/compiler (EPC) 328 communicatively coupled to the model factory 324, and an equation evaluation engine 318 communicatively coupled to the EPC 328 and the process controller 302.

In this example, the equation editor 321 provides a GUI to a user for entry of balance equations to describe chemical processes to be controlled by the process controller 302. The equations may be entered based on chemical engineering knowledge and without requiring knowledge of a modeling language. The equation editor 321, in cooperation with the EES 314, displays function evaluations for the entered expressions, evaluates systems of equations that the user has entered, and displays simulation results in an intuitive way for interpretation by the user. The equation editor 321 may evaluate and highlight errors in the entered equations. The EES 314 may also evaluate systems of equations, generating residuals and outputs to carry out parameter estimation (PE) studies, model-based control strategies (both linear and non-linear), and trajectory optimization (TO) studies.

Figure 4:
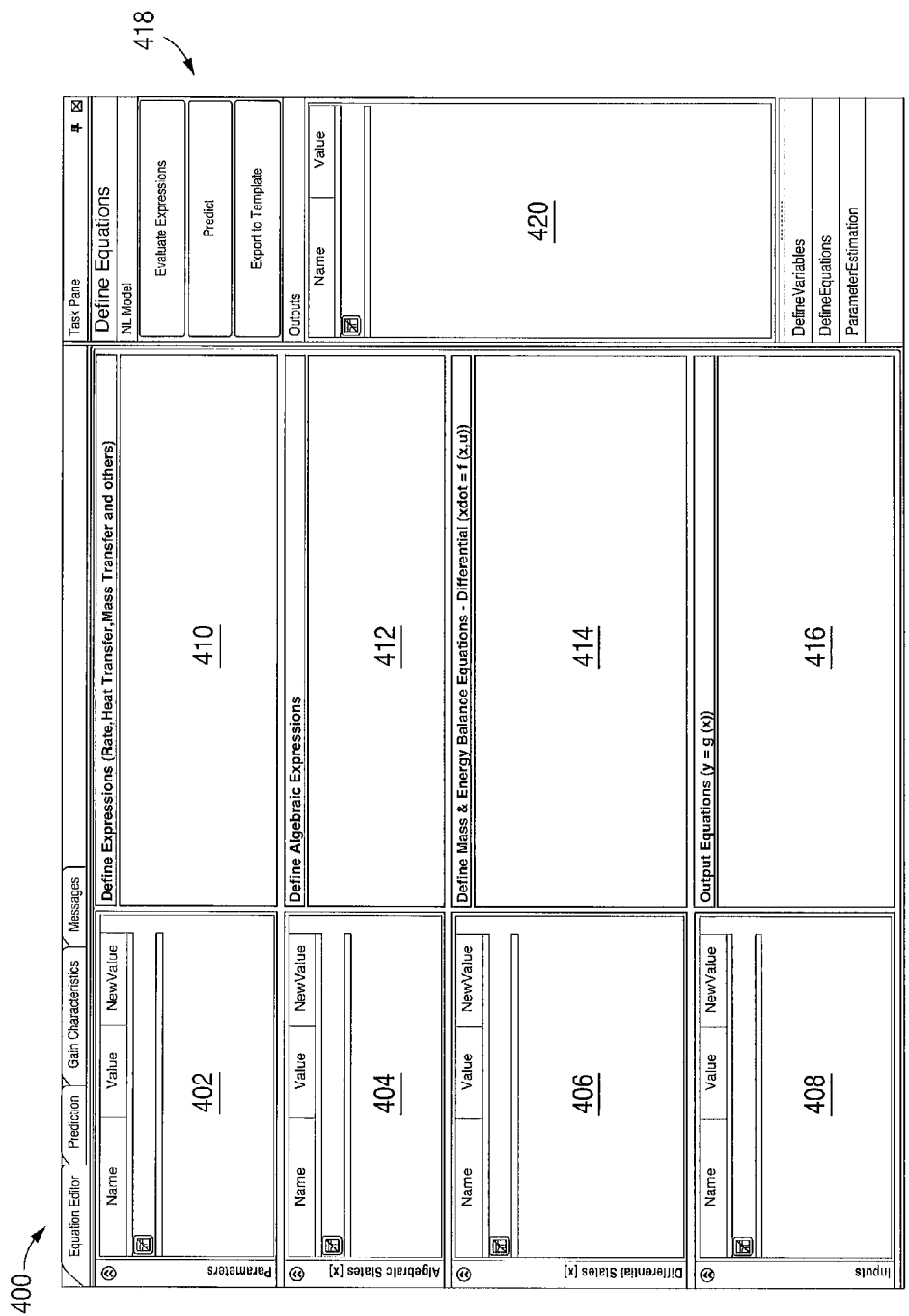
FIG. 4 illustrates an example graphical user interface for an equation editor according to this disclosure.

FIG. 4 illustrates an example graphical user interface 400 for the equation editor 321 according to this disclosure. In this example, a parameter section 402 provides for entry of constants and parameters that are used in construction of a model. An algebraic states section 404 provides for entry of algebraic states that are used for model construction. A differential states section 406 provides for entry of differential states that are used in the construction of the model. An inputs section 408 provides for entry of inputs and disturbance variables used in the construction of the model.

An expressions section 410 provides for entry of expressions that may be related to chemical kinetic rates, mass transfer relations, and/or heat transfer relations of the model. An algebraic equations section 412 provides for entry of algebraic equations that describe relationships or dynamics between variables such as pressure and thermodynamic relations. These relations are typically so fast in nature that they are approximated as algebraic equations instead of differential equations. Typically, the number of algebraic equations defined in the algebraic equations section 412 is equal to the number of algebraic states defined in the algebraic states section 404. Equations in the algebraic equations section 412 can be described in the form $g(x,u,z)=0$, where x represents differential states, u represents inputs, and z represents algebraic states.

A differential equations section 414 provides for entry of ordinary differential equations describing relations such as mass balance, energy balance, and/or momentum balance. These balance equations could include partial differential equations, which may be converted to ODEs with some approximations for use in the equation editor 321. Typically, the number of differential equations defined in the differential equations section 414 is equal to the number of differential states defined in the differential states section 406. Equations in the differential equations section 414 can be described in the form $\dot{X}=f(x,u,z)$, where x represents differential states, u represents inputs, and z represents algebraic states.

An output equations section 416 provides for entry of equations relating to final output or quality variables of plant differential states. A button section 418 provides buttons for expression evaluation and for prediction/simulation of non-linear process for changes in inputs/disturbances. Once a model is constructed, some of its parameters may be estimated using a real-time plant as is done in other modeling environments. The model may also be used for control and/or optimization studies. An outputs section 420 provides a display of final outputs of the process modeled in the equation editor 321.

Variables used in an equation can be defined with a value or as an expression defined in the "Expressions section". Variables defined in the expressions section 410 may be re-used later in the algebraic equations section 412, the differential equations section 414, and/or the output equations section 416.

FIG. 5 illustrates an example of the equation editor 400 used to describe a case study model according to this disclosure. In this example, the equation editor 321 is used to describe a model of a Benchmark Continuous Stirred Tank Reactor B-CSTR) case study for production of cyclo-pentenol in which a Van-de-Vusse reaction occurs.

Returning to FIG. 3, the equation editor 321 generates model information 323 representing the parameters, states, inputs, expressions, and equations that the user enters. The equation editor 321 may send the model information 323 to the model factory 324 for immediate use. The equation editor 321 may also store the model information 323 in a data store 325 for later use by the model factory 324.

The model factory 324 uses the model information 323 to generate a model object 326. The model object 326 can include information representing how many constants, parameters, differential states, algebraic states, and inputs are in the model, as well as the names of those model elements. The model object 326 can also include information representing how many expressions, algebraic equations, differential equations, and output equations are in the model and representations of those model elements.

The model factory 324 sends the model object 326 to the equation parser/compiler (EPC) 328. The EPC 328 compiles an equation stack 316 by parsing the equations of the model object 326 using the expressions, inputs, states, parameters, and constants of the model object 326. The EPC 328 can generate one stack in the equation stack 316 for each equation in the model object 326. Where the user has entered equations in 'infix' form [e.g., (a+b)+c], the EPC 328 may convert the equations to a 'postfix' [e.g., ab+c+] or 'prefix' [e.g., ++abc] form equation stack.

The equation stack 316 is sent by the equation parser/compiler 328 to the equation evaluation engine (EEE) 318. The EEE 318 may then use the equation stack 316 in response to calls from the process controller 302 with evaluation information 320, which may identify model equations to be evaluated. The evaluation information 320 may also include (or the EEE 318 may request) values for model states, inputs, or parameters to use in evaluating the model equations. The values for model states, inputs, or parameters may be actual, predicted, or simulated values. Generally, the EEE 318 evaluates all equations in the equation stack 316 in response to calls from the process controller 302 with evaluation information 320.

The EEE 318 may respond to the evaluation information 320 from the process controller 302 with results 322 that include equations evaluated for given specified values of states and/or inputs. The results 322 may also include evaluated values for states and model parameters, given specified values of inputs and predicted values of states and model parameters. The results 322 may further include a residual and an output for given specified values of states, inputs, and model parameters.

As an example of the operation of the modeling system 314 and the equation evaluation engine 318, a user may enter the differential equation:

$$d\text{Ca}dt = F/V^*\text{Cain} - F/V^*Ca$$

into the differential equations section 414 in the GUI 400 of the equation editor 321. The user may also enter the output equation:

$$\text{OutputConc} = Ca$$

into the output equations section 416 in the GUI 400. The equation editor 321 can then send to the model factory 324 the model information 323, including the following information:
- Expressions: Empty
- Algebraic Equations Empty
- Differential Equations: "dCadt=F/V*Cain–F/V*Ca"
- Output Equations: "OutputConc=Ca".

The model factory 324 can then send to the equation parser/compiler 328 the model object 326, including the following information:
- No. of Constants: 1, Name: "V"
- No. of Parameters (P): 0, Name: " "
- No. of Differential States (X): 1, Name: "Ca"
- No. of Algebraic States (Z): 0, Name: " "
- No. of Inputs (U): 2, Name: "F", "Cain"
- No. of Expressions: 0
- No. of Algebraic Equations: 0
- No. of Differential Equations: 1
  - Equation: "dCadt=F/V*Cain-F/V*Ca"
- No of Output Equations (Y): 1
  - Equation: "OutputConc=Ca".

The equation parser/compiler 328 can then send to the equation evaluation engine 318 the equation stack 316, including the following information:

Equation ID: "dCadt"
  Equation Stack: "FV/Cain*FV/Ca*−"
Equation ID: "OutputConc"
  Equation Stack: "Ca".

The process controller 302 may then call the equation evaluation engine 318 to request evaluating the "dCadt" equation. The process controller 302 can provide values for the inputs "F" and "Cain" and for the constant "V". The EEE 318 uses the values and the equation stack identified by "dCadt" to evaluate the equation and return a value for the equation.

In this example, the process controller 302 includes a process control system (PCS) 332 for controlling a process modeled by the modeling system 314. The PCS 332 receives one or more target values 378 from an operator or higher-level process control system. The PCS 332 also receives measured values 380 for one or more controlled variables of the process and possibly measured values 382 for one or more disturbance variables of the process. The PCS 332 generates one or more control signals 376 for one or more manipulated variables to control the process.

During control of the process, the PCS 332 uses a linearizer 334 to linearize non-linear equations of the process model generated by the modeling system 314. The PCS 332 sends model states and inputs to the linearizer 334 via a data flow 336. The linearizer 334 also receives estimated model parameters from a parameter estimator 344 via a data flow 384. The linearizer 334 sends a data flow 338 to the EEE 318, where the data flow 338 includes the received model states and inputs. In response, the linearizer 334 receives a data flow 340 from the EEE 318, where the data flow 340 includes the differential equations, algebraic equations, and output equations of the model evaluated for the specified model states and inputs. The linearizer 334 then generates a linearized model 342, which is sent to the PCS 332 for use in controlling the modeled process.

The parameter estimator 344 receives inputs via a data flow 346 from the PCS 332. The parameter estimator 344 sends the received inputs via a data flow 350 to a sequential quadratic programming (SQP) solver 348 to optimize values for model states and parameters for the specified inputs. The SQP solver 348 then iteratively calls the EEE 318 with the received inputs and trial values for model states and parameters, as well as an identification of one or more equations to be evaluated, in a data flow 352. The EEE 318 evaluates the identified equation (s) for the specified inputs, trial model states, and trial model parameters and returns model states and parameters in a data flow 354. Once the SQP solver 348 has reached sufficiently optimized values for model states and parameters for the specified inputs, the optimized model states and parameters are sent to the parameter estimator 344 via a data flow 356. The parameter estimator 344 then provides estimated model parameters to the linearizer 334 via the data flow 384 and to a predictor 360 via a data flow 386. The parameter estimator 344 also provides estimated model states to the PCS 332 via the data flow 358.

The predictor 360 receives current values of model states and inputs from the PCS 332 via a data flow 362. The predictor 360 returns to the PCS 332 predicted future values of model states and outputs via a data flow 374. To generate the predicted future values, the predictor 360 sends the current model states to an ODE/DAE solver 364 via a data flow 366, The ODE/DAE solver 364 calls the EEE 318 via a data flow 368 with model state values and identifiers of model equations. In evaluating the specified model equations, the EEE 318 also receives inputs and model parameters from the predictor 360 via a data flow 388. The EEE 318 returns values for residuals and outputs to the ODE/DAE solver 364 via a data flow 370. The ODE/DAE solver 364 returns predicted future values of model states and outputs to the predictor 360 via a data flow 372. The predictor 360 returns the predicted future values of the model states and outputs to the PCS 332 via a data flow 374.

While FIG. 3 shows the modeling system 314, the equation evaluation engine 318, and the process controller 302 as separate elements, it will be understood that the elements of these components may be grouped differently in other embodiments. In some embodiments, the equation editor 321 may be located separately from the other elements, and the data store 325 can be used to transfer the model information 323 from the equation editor 321 to the model factory 324. In other embodiments, the modeling system 314 and the EEE 318 may be incorporated into the process controller 302. Each of the components shown in FIG. 3 could be implemented using any suitable hardware, software, firmware, or combination thereof. In particular embodiments, for example, the system 300 could be implemented using at least one processing device (such as a microprocessor or microcontroller), at least one memory storing data and instruction associated with the processing devices, and at least one network interface (such as an Ethernet interface).

Figure 6:
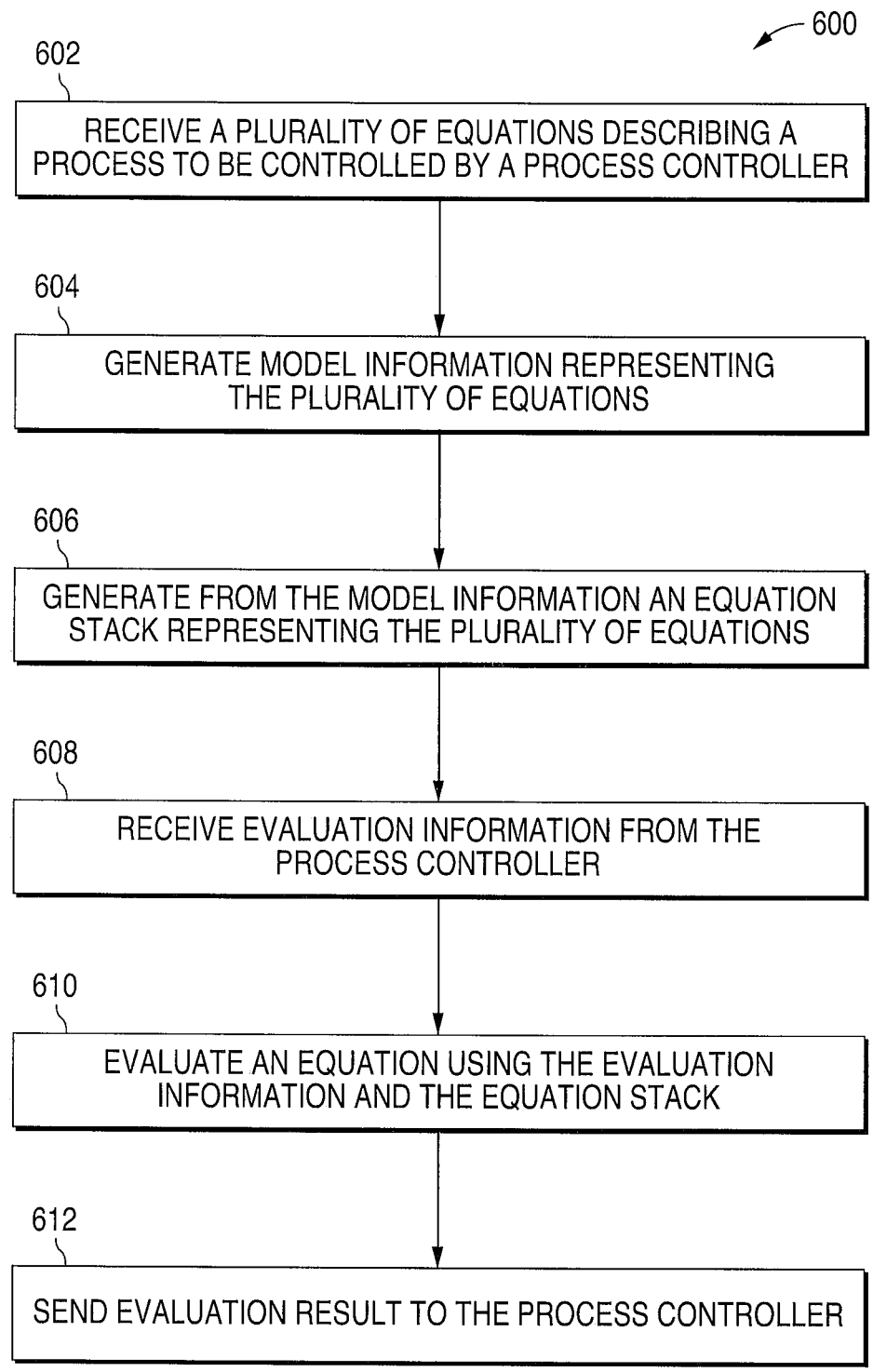
FIG. 6 illustrates an example method for model-based process control according to this disclosure.

FIG. 6 illustrates an example method 600 for model-based process control according to this disclosure. For ease of explanation, the method 600 is described with respect to the system 300 of FIG. 3. However, the method 600 could be used by any suitable device or system.

In step 602, the equation editor 321 receives equations and other information that describe a process to be controlled by the process controller 302 from a user. The information can include constants, parameters, algebraic states, differential states, inputs, disturbance variables, expressions, algebraic equations, differential equations, and output equations. In step 604, the equation editor 321 generates model information 323 representing the equations and other information received from the user.

In step 606, the model factory 324 generates a model object 326 representing the equations and other information based on the model information 323. Also in step 606, the equation parser/compiler 328 generates the equation stack 316 representing the equations and other information using the model object 326.

In step 608, the equation evaluation engine 318 receives evaluation information 320 from the process controller 302. The evaluation information 320 can include an identification of one or more equations to be evaluated and may include values for model states, inputs, and/or parameters to use in solving the model equation (s). In step 610, the EEE 318 evaluates the one or more identified equations using the evaluation information 320 and the equation stack 316. In step 612, the EEE 318 sends the evaluation results 322 to the process controller 302.

Although the figures above have illustrated details of example systems, GUIs, and methods, various changes may be made to these figures. For example, various components in the systems could be combined, further subdivided, omitted, or moved and additional components could be added. In addition, any other GUIs could be used to collect relevant information from one or more users.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. Terms like "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus for use with a process controller, the apparatus comprising at least one processing device configured to implement:
   an equation editor configured to receive balance equations describing a chemical process to be controlled by the process controller using a model and to generate model information representing the balance equations;
   a model factory configured to receive the model information from the equation editor and generate an equation stack using the model information, the equation stack representing the balance equations;
   an equation evaluation engine configured to receive evaluation information from the process controller, evaluate at least one of the balance equations using the evaluation information and the equation stack, and provide an output of the evaluation; and
   a linearizer configured to (i) receive states and inputs of the model from the process controller, estimated parameters of the model, and equations evaluated for the states and inputs of the model from the equation evaluation engine, (ii) generate a linearized model by linearizing non-linear equations in the evaluated equations based on the states and inputs, the estimated parameters, and the output from the equation evaluation engine, and (iii) provide the linearized model to the process controller in order to control the process.

2. The apparatus of claim 1, wherein:
   the model factory comprises an equation parser compiler configured to convert the received balance equations into at least one of: an infix form equation stack, a postfix form equation stack, and a prefix form equation stack;
   the model factory is configured to generate a model object from the model information; and
   the equation parser compiler is configured to generate the equation stack from the model object, wherein the equation parser compiler is configured to generate one stack in the equation stack for each equation in the model object.

3. The apparatus of claim 1, wherein:
   the equation editor is configured to store the model information in a data store; and
   the model factory is configured to read the model information from the data store.

4. The apparatus of claim 1, wherein the model information includes information representing algebraic equations and differential equations.

5. The apparatus of claim 4, wherein:
   the model information further includes algebraic states and differential states;
   the algebraic states correspond to the algebraic equations; and
   the differential states correspond to the differential equations.

6. The apparatus of claim 5, wherein:
   the model information further includes inputs; and
   one or more of the differential equations represent one or more corresponding relationships between one or more of the differential states, one or more of the inputs, and one or more of the algebraic states.

7. The apparatus of claim 4, wherein:
   the model information further includes parameters, constants, and expressions; and
   one or more of the expressions include one or more of the parameters and constants.

8. The apparatus of claim 1 further comprising:
   a predictor configured to receive current values of the states and inputs of the model from the process controller and the estimated parameters of the model, generate predicted future values of the states and outputs of the model, and provide the predicted future values to the process controller.

9. A system comprising:
   a process controller configured to control a chemical process using a model; and
   an equation evaluation apparatus comprising at least one processing device configured to implement:
      an equation editor configured to receive balance equations describing the chemical process and to generate model information representing the balance equations;
      a model factory configured to receive the model information from the equation editor and generate an equation stack using the model information, the equation stack representing the balance equations;
      an equation evaluation engine configured to receive evaluation information from the process controller, evaluate at least one of the balance equations using the evaluation information and the equation stack, and provide an output of the evaluation; and
   a linearizer configured to (i) receive states and inputs of the model from the process controller, estimated parameters of the model, and equations evaluated for the states and inputs of the model from the equation evaluation engine, (ii) generate a linearized model by linearizing non-linear equations in the evaluated equations based on the states and inputs, the estimated parameters, and the output from the equation evaluation engine, and (iii) provide the linearized model to the process controller in order to control the process.

10. The system of claim 9, wherein:
the model factory comprises an equation parser compiler;
the model factory is configured to generate a model object from the model information; and
the equation parser compiler is configured to generate the equation stack from the model object.

11. The system of claim 9, wherein:
the equation editor is configured to store the model information in a data store; and
the model factory is configured to read the model information from the data store.

12. The system of claim 9, wherein the model information includes information representing algebraic equations and differential equations.

13. The system of claim 12, wherein:
the model information further includes algebraic states and differential states;
the algebraic states correspond to the algebraic equations; and
the differential states correspond to the differential equations.

14. The system of claim 13, wherein:
the model information further includes inputs; and
one or more of the differential equations represent one or more corresponding relationships between one or more of the differential states, one or more of the inputs, and one or more of the algebraic states.

15. The system of claim 12, wherein:
the model information further includes parameters, constants, and expressions; and
one or more of the expressions include one or more of the parameters and constants.

16. A method comprising:
receiving balance equations describing a chemical process to be controlled by a process controller using a model;
generating, using at least one processing device, model information representing the balance equations;
generating an equation stack using the model information, the equation stack representing the balance equations;
receiving evaluation information from the process controller;
evaluating at least one of the balance equations using the evaluation information and the equation stack;
receiving states and inputs of the model from the process controller, estimated parameters of the model, and equations evaluated for the states and inputs of the model;
generating a linearized model by linearizing non-linear equations in the evaluated equations based on the states and inputs, the estimated parameters, and an output from the evaluation of the at least one balance equation; and
providing the linearized model to the process controller in order to control the process.

17. The method of claim 16, wherein generating the equation stack comprises:
generating a model object representing the balance equations; and
parsing or compiling the model object to generate the equation stack.

18. The method of claim 16, further comprising:
storing the model information in a data store; and
reading the model information from the data store before generating the equation stack.

19. The method of claim 16, wherein the model information includes information representing algebraic equations and differential equations.

20. The method of claim 19, wherein:
the model information further includes algebraic states and differential states;
the algebraic states correspond to the algebraic equations; and
the differential states correspond to the differential equations.

21. The method of claim 20, wherein:
the model information further includes inputs; and
one or more of the differential equations represent one or more corresponding relationships between one or more of the differential states, one or more of the inputs, and one or more of the algebraic states.

* * * * *